UNITED STATES PATENT OFFICE.

GEORGE F. GODLEY, OF PHILADELPHIA, PENNSYLVANIA.

COMPOSITION OF MATTER FOR THE MANUFACTURE OF AXLE-BEARINGS.

SPECIFICATION forming part of Letters Patent No. 354,126, dated December 14, 1886.

Application filed March 30, 1886. Serial No. 197,187. (No specimens.)

*To all whom it may concern:*

Be it known that I, GEORGE F. GODLEY, a citizen of the United States, residing at Philadelphia, in the county of Philadelphia and State of Pennsylvania, have invented certain new and useful Improvements in Composition of Matter for the Manufacture of Axle-Bearings, of which the following is a specification.

The object of my invention is to provide an inexpensive material having the proper hardness and durability for the manufacture of axle or journal bearings, packings for pistons, valves, and like articles.

My invention consists of a compound composed of graphite or plumbago, asbestus, and sulphate of alumina.

The graphite or plumbago is preferably reduced to a fine powder or granulated condition, as is also the asbestus, and both are well mixed or commingled together. The sulphate of alumina is preferably dissolved in water and precipitated by ammonia-water to form a jelly, or it may be otherwise used, as desired. These substances are then mixed together to the desired consistency and the product molded into a desired form and dried by artificial or natural heat, and subjected to pressure, if deemed necessary. The pressure may be applied either before or after the drying operation, as desired.

The proportions of the materials above named, which I have found to produce a good article, are one pound of graphite or plumbago, one pound of asbestus, and one-half pound of sulphate of alumina. These proportions, however, may be varied without departing from my invention.

What I claim is—

A composition of matter consisting of graphite or plumbago, asbestus, and sulphate of alumina, substantially as and for the purpose set forth.

In testimony whereof I affix my signature in presence of two witnesses.

GEORGE F. GODLEY.

Witnesses:
 S. J. VAN STAVOREN,
 CHAS. F. VAN HORN.